United States Patent [19]

Hodakowski et al.

[11] 4,260,703

[45] Apr. 7, 1981

[54] NOVEL URETHANE-ACRYLATE AND RADIATION CURABLE COMPOSITIONS

[75] Inventors: Leonard E. Hodakowski, St. Albans; Joseph V. Koleske, Charleston, both of W. Va.

[73] Assignee: Union Carbide Corporation, New York, N.Y.

[21] Appl. No.: 88,554

[22] Filed: Oct. 26, 1979

[51] Int. Cl.$^3$ .................................. C08L 75/08
[52] U.S. Cl. ........................ 525/455; 204/159.14; 204/159.6; 525/404; 525/411; 525/920; 560/186
[58] Field of Search ............... 525/455, 920, 404, 411

[56] References Cited

U.S. PATENT DOCUMENTS

| Re. 29,131 | 2/1977 | Smith | 260/77.5 AN |
|---|---|---|---|
| 4,034,017 | 7/1977 | Chang | 525/455 |
| 4,111,769 | 9/1978 | Stueben | 525/404 |
| 4,129,709 | 12/1978 | Lorenz | 525/455 |
| 4,163,114 | 7/1979 | Koleske | 560/170 |
| 4,188,455 | 2/1980 | Howard | 525/920 |

Primary Examiner—Paul Lieberman
Attorney, Agent, or Firm—Stanley Ktorides

[57] ABSTRACT

Novel ester diol alkoxylate urethane-acrylates comprising the reaction products of an ester diol alkoxylate, such as 2,2-dimethyl-3-hydroxypropyl 2,2-dimethyl-3-hydroxypropionate, and an organic polyisocyanate, capped by an hydroxyalkyl acrylate and curable compositions thereof.

9 Claims, No Drawings

NOVEL URETHANE-ACRYLATE AND RADIATION CURABLE COMPOSITIONS

BACKGROUND OF THE INVENTION

Coatings plays a useful role in the manufacture of a great many articles which find wide use in nearly all facets of contemporary life. Until recently, nearly all coatings were applied with the employment of a hydrocarbon based vehicle which evaporated leaving the dried coating on the article which was to be coated. This system met with increasing disfavor as the cost of energy needed to drive off the solvent at the rate required by industry increased, as the price of the organic solvent itself increased and as the deleterious environmental effects of the evaporated solvent became better understood. Systems aimed at solvent recovery to reduce pollution and conserve solvent have generally proved to be energy intensive and costly.

In response, those skilled in the art have devised a class of coatings termed radiation-curable coatings. In one type of radiation-curing termed photocuring, a solution of a photoinitiator in a reactive coating liquid is employed. The liquid approaches a pollution-free system as almost all of the liquid is converted to cured coating with little or no solvent emission upon the brief exposure of the coated substrate to radiation such as electron beam or ultraviolet light. The ultraviolet light equipment generally has a low demand for electrical energy and thus many technical and cost deficiencies caused by the pollution and energy problems of organic solvent systems are overcome.

Among the useful radiation curable coatings are those formulated with urethane-acrylates such as those disclosed in U.S. No. Reissue 29,131. Because of the wide use which radiation curable coatings have found, and, particularly because of the many advantages of radiation curable coatings which are formulated with urethane-acrylates, any new radiation-curable composition or any new compound which can be formulated into radiation curable compositions, especially novel urethane-acrylate compounds, would be very useful.

SUMMARY OF THE INVENTION

It has now been found that novel urethane-acrylates can be prepared by the reaction of an alkoxylate of an ester diol, such as 2,2-dimethyl-3-hydroxypropyl 2,2-dimethyl-3-hydroxypropionate, with an organic polyisocyanate, such as diisocyanate, followed by capping of the reaction product with an acrylyl compound such as an hydroxy alkyl acrylate or methacrylate. The resulting ester diol urethane-acrylates can be used per se or incorporated into radiation curable compositions.

DESCRIPTION OF THE INVENTION

The ester diol alkoxylates useful in this invention are those, for example, disclosed in U.S. Pat. No. 4,163,114 issued on July 31, 1979, which patent is incorporated herein by reference, and are defined by the structural formula

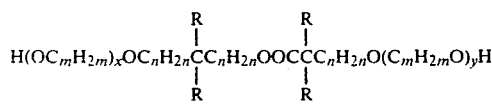

wherein m is an integer having a value of from 2 to 4, preferably 2 or 3; n is an integer having a value of from 1 to 5, preferably 1 to 3 and most preferably from 1 to 2; x and y are each integers having a value of from 1 to 20, preferably 1 to 10; and R is an unsubstituted or substituted, linear or branched alkyl group having from 1 to 8 carbon atoms, preferably 1 to 3 carbon atoms. The substituents on the R group can be any inert group that will not interfere with the reactions involved and can be for example, cyano, halogen, alkoxyl, nitro, tertiary amine, sulfo, etc. In the formulas the variables R, m,n, x and y can be the same or different at the various locations.

The ester diol alkoxylates (I) are preferably produced by the catalytic reaction of an ester diol (II) corresponding to the general formula

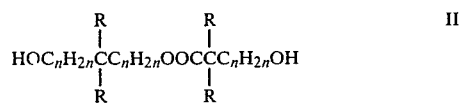

with an alkylene oxide or mixtures of alkylene oxides at an elevated temperature as more fully discussed below. One can thus manufacture the mono, mixed blocked or capped adducts.

The alkylene oxides suitable for use in the production of the ester diol alkoxylates are the oxirane compounds such as styrene oxide, ethylene oxide, 1,2-propylene oxide, 1,3-propylene oxide, 1,2-butylene oxide, 1,3-butylene oxide and 1,4-butylene oxide as well as similar higher aliphatic monoepoxides.

The ester diols of formula II include 2,2-dimethyl-3-hydroxypropyl, 2,2-dimethyl-3-hydroxypropionate; 2,2-dimethyl-4-hydroxybutyl 2,2-dimethyl-3-hydroxypropionate; 2,2-dimethyl-4-hydroxybutyl 2,2-dimethyl-4-hydroxybutyrate; 2,2-dipropyl-3-hydroxypropyl 2,2-dipropyl-3-hydroxypropionate; 2-ethyl-2-butyl-3-hydroxypropyl 2-ethyl-2-butyl-3-hydroxypropionate; 2-ethyl-2-methyl-3-hydroxypropyl 2-ethyl-2-methyl-3-hydroxypropionate; and the like.

During the reaction of the ester diol II with the alkylene oxide a catalyst is preferably used in a catalytically effective amount. The amount of catalyst is from 0.01 to 5 weight percent, preferably from 0.05 to 0.5 weight percent, based on the combined weights of ester diol II and alkylene oxide. The catalysts useful are known to those skilled in the art of alkylene oxide addition chemistry and require little further discussion here. Illustrative thereof one can mention boron trifluoride etherate, potassium, potassium hydroxide, sodium, sodium hydroxide, Lewis acids, sodium ethoxide, mineral acids, and the like.

The reaction of the ester diol (II) with the alkylene oxide is carried out at a temperature of from 20° to 150° C., preferably from 50° to 120° C. for a period of time sufficient to complete the reaction between the reactants charged. The temperature is often dependent upon the particular catalyst selected and the alkylene oxide employed. The time will vary depending upon the size of the batch and the particular reactants and catalysts, and the reaction conditions employed.

The reaction can be conducted at subatmospheric, atmospheric or superatmospheric pressure. The pressure is not critical and sufficient pressure is generally used to retain the reactants in the reactor in liquid form.

The amount of alkylene oxide charged to the reaction is from about 2 moles to about 40 moles, or more, per mole of ester diol (II) charged; preferably from 2 to 20 moles.

To minimize oxidative side reactions the reaction is preferably carried out under an inert gas atmosphere using nitrogen, argon or other inert gas.

If desired an inert solvent such as toluene, benzene or 1,1,1-trichloroethane can be employed. However, the reaction proceeds well in the absence of any such solvent. In most instances a solvent is not required as the ester diol is itself a liquid at the elevated temperatures employed and serves to maintain a liquid reaction system.

At the conclusion of the reaction the product, consisting of a mixture of the ester diol alkoxylates (I), is recovered as a residue product and can be used as such; distillation procedures can also be used to to recover more refined products.

The organic polyisocyanates useful are well known to those skilled in the art and include the known aliphatic and aromatic polyisocyanates. Illustrative thereof one can mention 3,5,5-trimethyl-1-isocyanato-3-isocyanatomethylcyclohexane, di(2-isocyanatoethyl)-bicyclo [2.2.1]-hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, triphenyl methane, diphenylene-4,4-diisocyanate, the polymethylene polyphenylisocyanates, as well as any of the other organic isocyanates, known to the average skilled chemist. Of course, mixtures of isocyanates can be used.

The hydroxyalkyl acrylyl compounds suitable for use are the hydroxy alkyl acrylates and the hydroxy alkyl methacrylates of the formula:

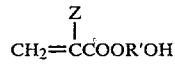

wherein Z is hydrogen or methyl and R' is a linear or branched divalent alkylene having from 2 to 8 carbon atoms, preferably 2 or 3 carbon atoms. The hydroxy alkyl acrylyl compounds are well known and can be illustrated by hydroxyethyl acrylate, hydroxyethyl methacrylate, hydroxypropyl acrylate, hydroxypentyl methacrylate and the like.

In the reaction to produce the novel urethane acrylates of this invention, the ester diol alkoxylate is initially reacted with the polyisocyanate to produce a prepolymer containing free isocyanato groups. The prepolymer is then further reacted with the hydroxy alkyl acrylyl compound to produce the novel compounds of this invention.

In producing the prepolymer the one mole of the ester diol alkoxylate, which has two free hydroxyl groups, theortically reacts with two moles of organic diisocyanate to form the prepolymer containing two free isocyanato groups, one at each end of the molecule. A slight excess of either reactant can be used if desired, a procedure known to those skilled in the art. Those skilled in the art will also understand the amounts required when a polyisocyanate other than a diisocyanate is used as a reactant.

After production of the prepolymer, it is then reacted with the hydroxyalkyl acrylyl compound. Sufficient hydroxyalkyl acrylyl compound is used to react with the free isocyanato groups present in the prepolymer. Again, a slight excess can be used to assure completion of the reaction.

The reaction of the ester diol alkoxylate, polyisocyanate and hydroxyalkyl acrylyl compound to produce the urethane-acrylates of this invention can be carried out in an organic solvent which is inert under the reaction conditions and which can also act as a viscosity reducer. There are many suitable solvents such as octane, benzene, toluene acetone, methyl ethyl ketone, diisopropyl ether and di-n-butyl ether and the like. In many cases the reaction can be carried out in a reactive solvent which can be retained in the formulation, used as a compound of the radiation curable composition and become incorporated in the cured composition. Among such reactive solvents one can name N-methyl carbamoyloxyethyl acrylate, 2-ethylhexyl acrylate styrene, alpha-methylstyrene, methyl methyacrylate, 2-butoxyethyl acrylate, butyl methacrylate, 2-phenylethyl acrylate, 2-phenoxyethyl acrylate, furfuryl acrylate and the like. The preferred reactive solvents are N-methyl-carbamoyloxyethyl acrylate and 2-ethylhexyl acrylate.

The reaction can be carried out in the presence of any of the known urethane catalysts such as the known amines or tin compounds. Among such catalysts one can name dibutyl tin dilaurate, triethylene diamine, morpholine, N-ethyl-morpholine, piperazine, triethanolamine, triethylamine, N,N,N',N'-tetramethylbutane-1,3-diamine, stannous octoate, stannous laurate, dioctyltin diacetate, lead octoate, stannous oleate, stannous tallate, dibutyl tin oxide and the like. The preferred catalyst is dibutyl tin dilaurate. The catalyst is present in any catalytically effective amount up to about 5 weight percent; it is preferably present at a concentration of from 0.10 weight percent to 0.20 weight percent, more preferably from 0.13 weight percent to 0.16 weight percent based on the total combined weight of the ester diol alkoxylate and the polyisocyanate charged to the reactor.

Any of the reaction steps of the process can be carried out a temperature of from about 10° C. to 100° C., preferably from about 25° C. to 60° C. The reaction can be carried out at subatmospheric, atmospheric or superatmospheric pressure; the preferred pressure is atmospheric. The reaction is preferably carried out under an inert gas atmosphere. Precautions should be taken to exclude water which is known to react with the isocyanato group. To prevent premature reaction of the acrylyl group in the final product, from 0.001 weight percent to 0.1 percent, preferably from 0.01 weight percent of 0.05 weight percent of a compound known to inhibit free radical polymerization can be added. The inhibitors are well known and include phenothiazine, hydroquinone, the monomethyl ether of hydroquinone, 2,6-t-butyl-p-cresol and other hindered phenols. The preferred inhibitor is the monomethyl ether of hydroquinone. The reaction time will vary and depend upon the size of the batch, the specific reactants employed, and the conditions under which the reaction is carried out. Completion of the reaction can be determined by analysis of free isocyanato group content.

In a typical embodiment an organic isophorone polyisocyanate is charged to a flask along with solvents and catalyst. The mixture is heated while continuously purging with dry air. Thereafter the ester diol alkoxylate is stirred in a dropwise manner and reacted; this is followed by the dropwise addition with stirring of the hydroxyalkyl acrylyl compound. The reaction is continued until completion as indicated by a low level of free isocyanato group in the reaction mixture. An inhibitor, such as monomethyl ether of hydroquinone, is then added to the urethane-acrylate reaction product.

The urethane-acrylate compositions of this invention can be used as coating compositions per se or in admixture with other conventional solvents, reactive oligomers and monomers, crosslinkers, fillers and other additives. They can be applied by conventional means and cured by exposure to heat, ionizing or non-ionizing radiation such as electron radiation or ultraviolet radiation, or other known means for curing coating compositions.

When non-ionizing radiation is to be used to cure the composition a photoinitiator or photosensitizer is incorporated into the coating in a concentration of from 0.1 weight percent to 10 weight percent. These compounds are well known and as illustrative thereof one can name di-sec-butoxyacetophone, benzophenone, p-methoxybenzophenone, acetophenone, m-chloroacetophenone, propiophenone, xanthone, benzoin, benzil, benzaldehyde, naphthoquinone, anthraquinone, and the like. When thermal curing is to be employed a free radical initiator can be used, such as di-t-butyl peroxide, dicumyl peroxide, t-butyl hydroperoxide, t-butyl peracetate, peracetic acid, perbenzoic acid, benzoyl peroxide, dichlorobenzoyl peroxide, azobis(isobutyronitrile), dimethyl azobis (isobutyrate), and the like. Activators can also be used, such as morpholine, diethylamine, piperidine, pyrrolidine, and the like, and mixtures thereof.

The coating compositions are produced by conventional methods by mixing the selected components together. The coatings can be applied by conventional means including spray, curtain, dip, pad, roll-coating and brushing procedures. The coatings can be applied to any acceptable substrate such as wood, metal, glass; fabric, paper, fiber, plastic that is in any form, e.g., sheet coil, molded, film, panel, tube, etc.

The following examples serve to further illustrate the invention.

EXAMPLE 1

To a 2-liter, 4-neck flask equipped with a stirrer, thermometer, reflux condenser and dropping funnel there were charged 123 grams of isophorone diisocyanate, 82 grams of N-methyl carbamoyloxyethyl acrylate as reactive solvent and 0.4 gram of dibutyl tin dilaurate as catalyst. The mixture was heated to 45° C. and purged with dry air. To this mixture there was added, dropwise and with stirring, a blend of 60 grams of a polycaprolactone triol having an average hydroxy number of 310 and a molecular weight of 540 and 106 grams of the ester diol alkoxylate which was the 6-mole ethylene oxide adduct of 2,2-dimethyl-3-hydroxypropyl 2,2-dimethyl-3-hydroxypropionate (produced as described in U.S. Pat. No. 4,163,114). The addition of this blend was made while the temperature was maintained at from 45° C. to 50° C. Thereafter 40 grams of 2-hydroxyethyl acrylate was added dropwise and with stirring, while maintaining the same and the reaction was continued until completion as indicated by the level of free isocyanato group of less than about 0.5 percent as determined by titration with HCl. The total time that elapsed from the initial charging of the reactor until completion of the reaction was 6.5 hours. The residue product was the urethane-acrylate of the ester diol alkoxylate in the reactive solvent N-methyl carbamoyloxyethyl acrylate. At the completion of the reaction, 0.07 gram of the monomethylether of hydroquinone was added as a stabilizer:

In a similar manner the ester diol alkoxylate urethane acrylate is produced substituting tolylene diisocyanate for the isophorone diisocyanate used above.

EXAMPLE 2-9

In each of Examples 2-9 a urethane-acrylate of the ester diol alkoxylates described was prepared in a manner similar to that described in Example 1 except that the reactive solvent diluent was a mixture of N-methyl carbamoyloxyethl acrylate and 2-ethylhexyl acrylate. The reactants and the proportions used are shown in Table I. In Table I, the abbreviations correspond to the following:

| | |
|---|---|
| IDPI | Isophorone diisocyanate |
| MCEA | N-methyl carbamoyloxyethyl acrylate |
| 2-HEA | 2-Ethylhexyl acrylate |
| HEA | Hydroxyethyl acrylate |
| DBT | Dibutyl tin dilaurate |
| MMEHQ | Monomethylether of hydroquinone |
| ED-204 | 2,2-Dimethyl-3-hydroxypropyl 2,2-dimethyl-3-hydroxypropionate |
| 2-ED-204 | The 2-mole ethylene oxide adduct of ED-204 |
| 4-ED-204 | The 4-mole ethylene oxide adduct ED-204 |
| 6-ED-204 | The 6-mole ethylene oxide adduct of ED-204 |
| 2,2-ED-204 | The mixed alkoxylate prepared from a mixed starter of 2-moles of ED-204 and 2 moles of Bisphenol-A reacted with 12 moles of ethylene oxide. |
| 1,1-ED-204 | The alkoxylate prepared from a mixed starter of 1 mole of ED-204 and 1 mole of Bisphenol-A reacted with 12 moles of ethylene oxide. |

TABLE I

| | 2 | 3 | 4 | 5 | 6 | 7 | 8 | 9 |
|---|---|---|---|---|---|---|---|---|
| IPDI (grams) | 222 | 222 | 444 | 222 | 222 | 222 | 222 | 222 |
| MCEA (grams) | 148 | 138 | 280 | 154 | 166 | 166 | 148 | 166 |
| 2-HEA (grams) | 74 | 35 | 140 | 77 | 83 | 83 | 74 | 83 |
| DBT (grams) | 0.7 | 0.7 | 1.4 | 0.8 | 0.8 | 0.8 | 0.7 | 0.8 |
| 2,2-ED-204 (grams) | 175 | 175 | — | — | — | — | 175 | — |
| 2-ED-204 (grams) | — | — | 295 | — | — | — | — | — |
| 4-ED-204 (grams) | — | — | — | 196 | — | — | — | — |
| 6-ED-204 (grams) | — | — | — | — | 238 | — | — | — |
| 1,1-ED-204 (grams) | — | — | — | — | — | 239 | — | 239 |
| HEA (grams) | 120 | 120 | 240 | 120 | 120 | 120 | 120 | 120 |
| MMEHQ (grams) | 0.1 | 0.07 | 0.14 | 0.1 | 0.1 | 0.1 | 0.1 | 0.1 |
| Reaction Time (hr:min) | 3:50 | 5:10 | 6:0 | 5:30 | 5:40 | 5:45 | 4:15 | 3:30 |
| Free Isocyanato after Reaction Time (percent) | 0.014 | — | 0.64 | 0.54 | — | — | — | 0.83 |

These examples demonstrates the wide variety of urethane-acrylate ester diol alkoxylate compounds obtainable by this invention.

EXAMPLE 10-14

Five photocurable coatings were formulated by mixing 99 grams of each of the urethane-acrylate products produced in Examples 4-8 with 1 gram of di-sec-butoxyacetophenone (DBAP) as photoinitiator. Each of the photocurable coatings were then coated using a number 40 wire wound rod onto release paper and cured by exposure for from 2 to 4 seconds to ultraviolet light radiation having a delivered flux density of 500 watts per square foot. The cured coatings were removed from the release paper and stored overnight. Thereafter the tensile strength and elongation of the cured coating were determined by ASTM D-638 in triplicate and the average for each coating is reported in Table II.

TABLE II

|  | Example | | | | |
| --- | --- | --- | --- | --- | --- |
|  | 10 | 11 | 12 | 13 | 14 |
| Product of Example | 4 | 5 | 6 | 7 | 8 |
| Viscosity, cps, 23° C., $\times 10^{-3}$ (Brookfield) | 26.8 | 12.0 | 5.9 | 12.2 | 35.6 |
| Tensile Strength (psi) | 6887 | 2730 | 2085 | 3372 | 6697 |
| Elongation (percent) | 3 | 47 | 73 | 62 | 5 |

What is claimed is:

1. Urethane acrylate ester diol alkoxylates comprising the reaction products of (A) an ester diol alkoxylate of the formula:

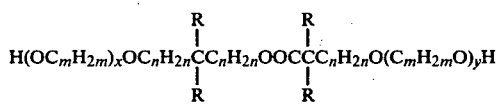

wherein m is an integer having a value of from 2 to 4; n is an integer having a value of from 1 to 5; x and y are each integers having a value of from 1 to 20; and R is an unsubstituted or substituted, linear or branched alkyl group having from 1 to 8 carbon atoms, (B) an organic polyisocyanate, and (C) a hydroxyalkyl acrylyl compound of the formula:

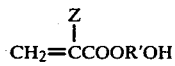

wherein Z is hydrogen or methyl and R' is a linear or branched divalent alkylene group having from 2 to 8 carbon atoms.

2. Urethane acrylate ester diol alkoxylates as claimed in claim 1, wherein component (A) is the adduct of 2,2-dimethyl-3-hydroxypropyl 2,2-dimethyl-3-hydroxypropionate and the average sum of x plus y is from 2 to 20.

3. Urethane acrylate ester diol alkoxylates as claimed in claim 2 wherein the average sum of x plus y is 2.

4. Urethane acrylate ester diol alkoxylates as claimed in claim 2 wherein the average sum of x plus y is 4.

5. Urethane acrylate ester diol alkoxylates as claimed in claim 2 wherein the average sum of x plus y is 6.

6. Urethane acrylate ester diol alkoxylates as claimed in claim 1 wherein component (B) is tolylene diisocyanate.

7. Urethane acrylate ester diol alkoxylates as claimed in claim 1 wherein component (B) is isophorone diisocyanate.

8. Urethane acrylate ester diol alkoxylates as claimed in claim 1 wherein component (C) is 2-hydroxyethyl acrylate.

9. A radiation curable composition comprising the urethane acrylate ester diol alkoxylate of claim 1 and from about 0.1 to about 10 weight percent thereof of a photoinitiator.